United States Patent [19]

Watanabe et al.

[11] 4,455,620

[45] Jun. 19, 1984

[54] DIRECT MEMORY ACCESS CONTROL APPARATUS

[75] Inventors: Masakatu Watanabe, Kyoto; Yukinori Hamada; Ryuichi Chiwaki, both of Nagaokakyo, all of Japan

[73] Assignee: Omron Tateisi Electronics Co., Kyoto, Japan

[21] Appl. No.: 324,607

[22] Filed: Nov. 24, 1981

[30] Foreign Application Priority Data

Nov. 29, 1980 [JP] Japan .................... 55-168679

[51] Int. Cl.³ .............................................. G06F 13/00
[52] U.S. Cl. ..................................................... 364/900
[58] Field of Search .................... 364/200 LE, 900 LE

[56] References Cited

U.S. PATENT DOCUMENTS

| | | | |
|---|---|---|---|
| 4,070,710 | 1/1978 | Sukonick et al. | 364/900 |
| 4,122,520 | 10/1978 | Adamchick et al. | 364/200 |
| 4,197,590 | 4/1980 | Sukonick et al. | 364/900 |

Primary Examiner—Felix D. Gruber
Assistant Examiner—John G. Mills
Attorney, Agent, or Firm—Schwartz, Jeffery, Schwaab, Mack, Blumenthal & Koch

[57] ABSTRACT

A direct memory access control apparatus performs direct data transfer between a memory and an input-/output controller in a data processing system. When the system is placed in a direct memory access mode upon receipt of a direct memory access request from the input/output controller, a data bus connected between the input/output controller and the memory is separated from a central processing unit by means of a data bus separating circuit, and an address bus of the memory is also separated from the central processing unit by means of an address bus switch circuit. The address bus of the memory is connected to a direct memory access controller by means of the address bus switch circuit. Therefore, the memory is addressed by the direct memory access controller through the address bus while the data is directly transferred between the memory and the input/output device through the data bus.

6 Claims, 10 Drawing Figures

DIRECT MEMORY ACCESS CONTROL APPARATUS

BACKGROUND OF THE INVENTION

1. Field of the Invention

The present invention relates to a direct memory access control apparatus, and more specifically to such a direct memory access control apparatus that is adapted for data transfer between an electronic cash register, for example, and an external high speed input-/output device without the active participation of a central processing unit.

2. Description of the Prior Art

A data collecting apparatus for collecting data registered in an electronic cash register by transferring the same to an external storage device is conventionally known. Such an external storage device may comprise a high speed input/output device such as a floppy disk, magnetic cassette storage, cartridge magnetic disk, or the like. A one-chip microcomputer is utilizied as a central processing unit for controlling the high speed input/output device. However, it is known that the processing speed of a one-chip microcomputer is relatively slow. Therefore, in transferring data between a high speed input/output device and an electronic cash register on a byte-by-byte basis, the processing operation of the central processing unit cannot follow the high speed input/output device. Although this problem can be solved by employing a high speed microcomputer, suitable high speed microcomputers are expensive. Therefore, in order to perform such data transfer, a direct memory access system for performing direct data transfer between a memory and a high speed input-/output device without direct control by the interposition of a central processing unit has been conventionally proposed.

Figure 1:
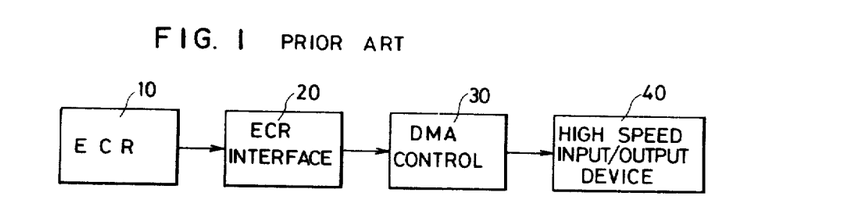
FIG. 1 is a block diagram of a data collecting apparatus which constitutes the background of the invention.

FIG. 1 is a block diagram of a known data collecting apparatus for performing data transfer between an electronic cash register and a high speed input/output device. Referring to FIG. 1, the data collecting apparatus in accordance with a conventional direct memory access system will be described. An electronic cash register 10 is connected to an electronic cash register interface 20 and the electronic cash register interface 20 is connected to a direct memory access control portion 30. A high speed input/output device 40 is connected to the direct memory access control portion 30. The direct memory access control portion 30 comprises a central processing unit and memory, which are coupled to each other by means of a data bus and an address bus. Upon receipt of a direct memory access request from the high speed input/output device 40, the central processing unit is placed in a floating state, in which it is not capable of communication with the memory. While the central processing unit is in the floating state, the direct data transfer, i.e. direct memory access transfer is performed between the high speed input/output device 40 and the memory.

According to such a conventional data collecting apparatus, since the central processing unit is placed in a floating state during direct memory access transfer, even if an interrupt signal is received at that time, the interrupt signal will be ignored and processing for that interrupt will not be preformed. More specifically, if an interrupt signal for clearing the contents in the memory upon turning off of a power supply, for example, is received by the central processing unit during the direct memory access transfer, the central processing unit will not respond. Therefore, there is no possibility that the contents of the memory will be erased. On the other hand, if an interrupt signal is received from the electronic cash register 10, the interrupt signal is also disregarded and hence any required processing cannot be performed. This can have detrimental results in that the cash register may not perform properly. Furthermore, if a HALT request signal is received while an interrupt processing operation is being performed after the central processing unit completed the direct data transfer, the interrupt processing operation is suspended.

In order to solve these problems, another system referred to as a cycle steal direct memory access system has been proposed for the central processing unit. The cycle steal direct memory access system is designed to perform direct memory access transfer on a byte-by-byte basis in accordance with a dummy cycle for each command stored in a read only memory. Although the cycle steal direct memory access system enables the central processing unit itself to perform other processing even during direct memory access transfer, another problem arises in that the time required for the data transfer to be completed is lengthened.

SUMMARY OF THE INVENTION

A direct memory access control apparatus in accordance with the present invention is adapted such that a data bus being connected to input/output control means and storage means is separated from central processing unit means and an address bus being connected to the storage means is also separated from the central processing unit means responsive to a direct memory access request from input/output control means. As a result, any necessity of placing the central processing unit means in a floating state is eliminated in transferring data between the input/output control means and the storage means. Accordingly, the data entered into and obtained from the central processing unit means is prevented from being influenced by the data being transferred even if direct data transfer is performed between the input/output control means and the storage means. Therefore, the central processing unit means can perform individually such an operation as interrupt processing without regard to the data transfer by the direct memory access.

In a preferred embodiment of the present invention, a data transfer line by a central processing unit mode and a data transfer line by a direct memory access mode can be selected. More specifically, in the central processing unit mode, a data bus switch circuit is controlled such that the data bus connecting the input/output controller and the memory is connected to the central processing unit and a first address bus switch circuit is controlled to switch to the central processing unit the address bus connected to the direct memory access controller and a second address bus switch circuit is controlled such that the address bus connected to the memory is switched to the central processing unit. In the direct memory access mode, the data bus separating circuit is controlled such that the data bus being connected to the input/output controller and the memory is separated from the central processing unit and the first address bus switch circuit is controlled such that the address bus connected to the direct memory access controller is switched to the memory and the second address bus switch circuit is controlled such that the address bus connected to the memory is switched to the direct memory access controller. Therefore, according to the embodiment, the data transfer line in the central processing unit mode and the data transfer line in the direct memory access mode can be selectively switched with a relatively simple structure.

Accordingly, a principle object of the present invention is to provide a direct memory access control apparatus in which a central processing unit can perform such an operation as interrupt processing independently even during direct memory access transfer of the data between a high speed input/output control device and a memory.

One aspect of the present invention resides to selectively switch a data transfer line in a central processing unit mode and a data transfer line in a direct memory access mode with a relatively simple structure.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
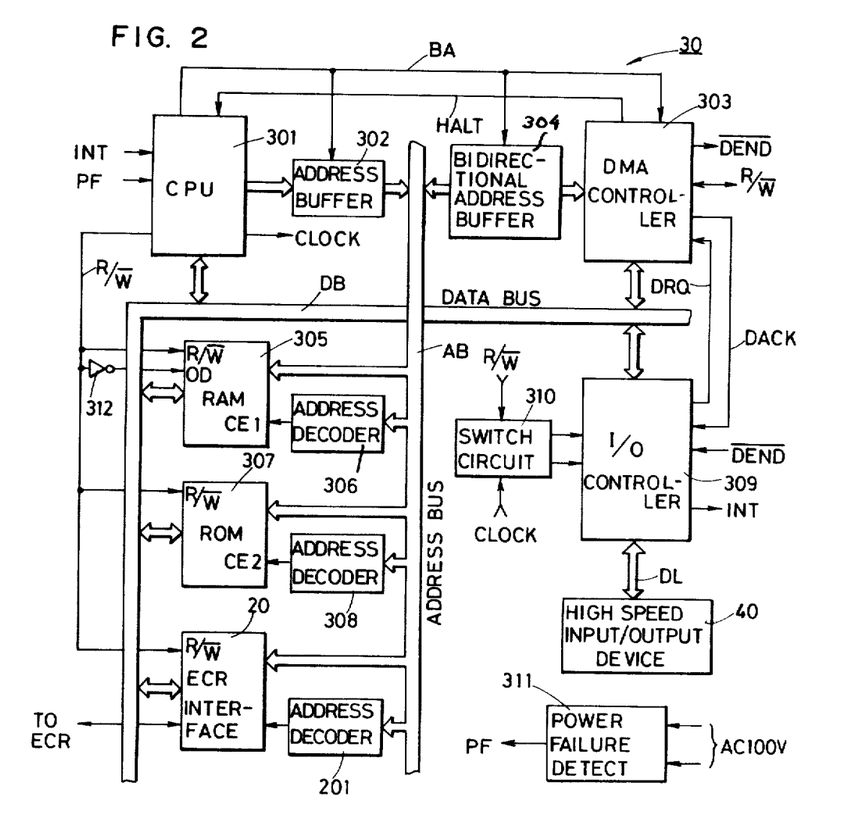
FIG. 2 is a more detailed block diagram of a direct memory access control portion depicting the concept of the present invention.

FIG. 2 is a block diagram of a direct memory access control portion depicting the concept of the present invention. First referring to FIG. 2, the structure of the direct memory access control portion 30 will e described. A central processing unit 301 is connected to a data bus DB and is also connected through an address buffer 302 to an address bus AB. A direct memory access controller 303 is connected to the data bus DB and is also connected through a bidirectional address buffer 304 to the address bus AB. A HALT request signal is applied from the direct memory access controller 303 to the central processing unit 301. The central processing unit 301 is responsive to the HALT request signal to provide a bus available signal BA to the direct memory access controller 303. The bus available signal BA is applied to the address buffer 302 and also to the bidirectional address buffer 304. The address buffer 302 and the bidirectional address buffer 304 are enabled when the bus available signal BA is at a low level to connect the central processing unit 301 to the address bus AB, and also connected the direct memory access controller 303 to the address bus AB. When the bus available signal BA is at a high level, the central processing unit 301 is no longer able to control the state of the memory.

The address bus AB serves to connected a random access memory 305, an address decoder 306, a read only memory 307, an address decoder 308, an electronic cash register interface 20 and an address decoder 201. The address decoder 306 is resonsive to an address signal to provide to the random access memory 305 a chip enable signal CE1 for enabling the random access memory 305. The address decoder 308 is responsive to an address signal to provide to the read only memory 307 a chip enable signal CE2 for enabling the read only memory 307. The address decoder 201 provides to the electronic cash register interface 20 a chip enable signal CE3 for enabling the electronic cash register interface 20.

The data bus DB serves to connect the direct memory access controller 303, the random access memory 305, the read only memory 307, the electronic cash register interface 20 and an input/output controller 309. The input/output controller 309 is connected through a data line DL to a high speed input/output device 40. A direct memory access request signal DRQ is provided from the input/output controller 309 to the direct memory access controller 303. The direct memory access controller 303 is responsive to the direct memory access request signal DRQ to provide an acknowledge signal DACK to the input/output controller 309. At the end of the direct memory access transfer, the direct memory access controller 303 provides to the input/output controller 309 a transfer end signal DEND representing the end of the direct memory access transfer. The input/output controller 309 provides an interrupt signal INT to the central processing unit 301 when the transfer end signal DEND is provided from the direct memory access controller.

An R/W signal is further provided from the central processing unit 301. The R/W signal is applied to an R/W by an inverter 312. The inverted output of inverter 312 is applied to an OD input terminal of the random access memory 305. Furthermore, the R/W signal is also applied to the read only memory 307, the electronic cash register interface 20, the direct memory access controller 303 and a switch circuit 310. The R/W signal is high during a READ state and is low during a WRITE state, thereby selectively controlling whether the random access memory 305, the read only memory 307, the electronic cash register interface 20, the direct memory access controller 303 and the input/output controller 309 are in the READ state or the WRITE state. A power failure detecting portion 311 is also provided for detecting failure of the power supply voltage. The power failure detecting portion 311 serves to detect failure of the power supply voltage and to provide to the central processing unit 301 a power failure interruption signal PF.

Now a READ operation for transferring the data from the high speed data input/output device 40 to the random access memory 305 without control by the central processing unit 301 will be described. The central processing unit 301 provides a command to the direct memory access controller 303 and the input/output controller 309 as preparatory processing of direct memory access. More specifically, the central processing unit 301 provides the address data for designating the memory address of the random access memory 305 to the direct memory access controller 303 through the data bus DB. At the same time, the central processing unit 301 provides a signal indicative of the number of data transfers to be made to the random access memory 305. This signal is passed to the direct memory access controller 303 through the data bus DB. Furthermore, the central processing unit 301 makes the R/W signal high. As a result, the input/output controller 309 reads the data from the high speed input/output device 40. When the input/output controller 309 reads the data of one byte from the high speed input/output device 40, a direct memory access requst signal DRQ is supplied to the direct memory access controller 303. When the direct memory access controller 303 acknowledges that the direct memory access request signal DRQ has been received, the direct memory access controller 303 provides a HALT request signal to the central processing unit 301. Accordingly, the central processing unit 301 acknowledges the HALT request signal by making the bus available signal BA high. When the bus available signal BA becomes high, the address buffer 302 is disabled and the bidirectional address buffer 304 is switched so that the address signal output thereof is obtained from the direct memory access controller 303 and passed to the address bus AB.

More specifically, thereafter it follows that the address signal is obtained only from the direct memory access controller 303. Furthermore, the data bus of the central processing unit 301 and the R/W signal are placed in a floating state; that is, are no longer responsive to the central processing unit 301. When the bus available signal BA becomes high, the direct memory access controller 303 determines that the central processing unit 301 is placed in a floating state and provides the acknowledge signal DACK to the input/output controller 309. As a result of this series of operations, transfer as per the direct memory access system becomes possible.

The direct memory access controller 303 makes the R/W signal low and provides to the address decoder 306 an address signal for selecting the random access memory 305. At the same time, the direct memory access controller 303 designates the address of the random access memory 305. The input/output controller 309 is responsive to the R/W signal becoming low to read the data being transferred from the high speed input/output device 40. The data as read is stored in the random access memory 305 through the data bus DB.

Meanwhile, while the data is being transferred to the random access memory 305, the central processing unit 301 is placed in a floating state and therefore no processing is performed even if an interrupt signal is applied. The input/output controller 309 releases the direct memory access request signal DRQ when one byte of data is transferred to the random access memory 305. The direct memory access controller 303 releases the HALT request signal when the direct memory access request signal DRQ is released. Accordingly, the central processing unit 301 makes the bus available signal BA. As a result, the address buffer 302 is enabled and the bidirectional address buffer 304 is switched, whereby it becomes possible for an address signal to be applied from the address bus AB to the direct memory access controller 303. Thereafter the central processing unit 301 returns to ordinary operation and operation in accordance with the program stored in the read only memory 307 is started. When an interrupt signal is provided, processing as per the interrupt signal is performed.

In the case where the high speed input/output device 40 is a floppy disk, for example, the above described operation is repeated 128 times to 256 times. When the direct memory access controller 303 determines that the transfer of all the data is completed, the transfer end signal DEND is provided to the input/output controller 309. The input/output controller 309 provides the interrupt signal INT to the control processing unit 301 when the transfer end signal DEND is provided. As a result, the central processing unit 301 acknowledges that the transfer is completed in a direct memory access mode.

Now a WRITE operation for transferring the data from the random access memory 305 to the high speed input/output device 40 in a direct memory access mode will be described. The central processing unit 301 provides a command t the direct memory acceess controller 303 and the input/output controller 309 as a preparatory processing of the direct memory access. More specifically, the central processing unit 301 provides the data representing the first address of the data being transferred as stored in the random access memory 305 and the required number of data transfers to be carried out to the direct memory access controller 303 through the data bus DB. Then the central processing unit 301 makes the R/W signal low.

The input/output controller 309 is responsive to R/W signal becoming low to read one byte of data from the random access memory 305. The input/output controller 309 provides the direct memory access request signal DRQ to the direct memory access controller 303. The direct memory access controller 303 brings the R/W signal high and transfers the data stored in the random access memory 305 to the high speed input/output device 40 through the input/output controller 309. Thereafter, in the same manner as previously described, the data stored in the random access memory 305 is transferred to the high speed input/output device 40 and when the transfer of all the data is completed, the transfer end signal DEND is provided from the direct memory access controller 303 to the input/output controller 309. The input/output controller 309 provides the interrupt signal INT to the central processing unit 301 when the transfer end signal DEND is provided. Accordingly, the central processing unit 301 performs ordinary operations as per the program stored in the read only memory 307.

Figure 3:
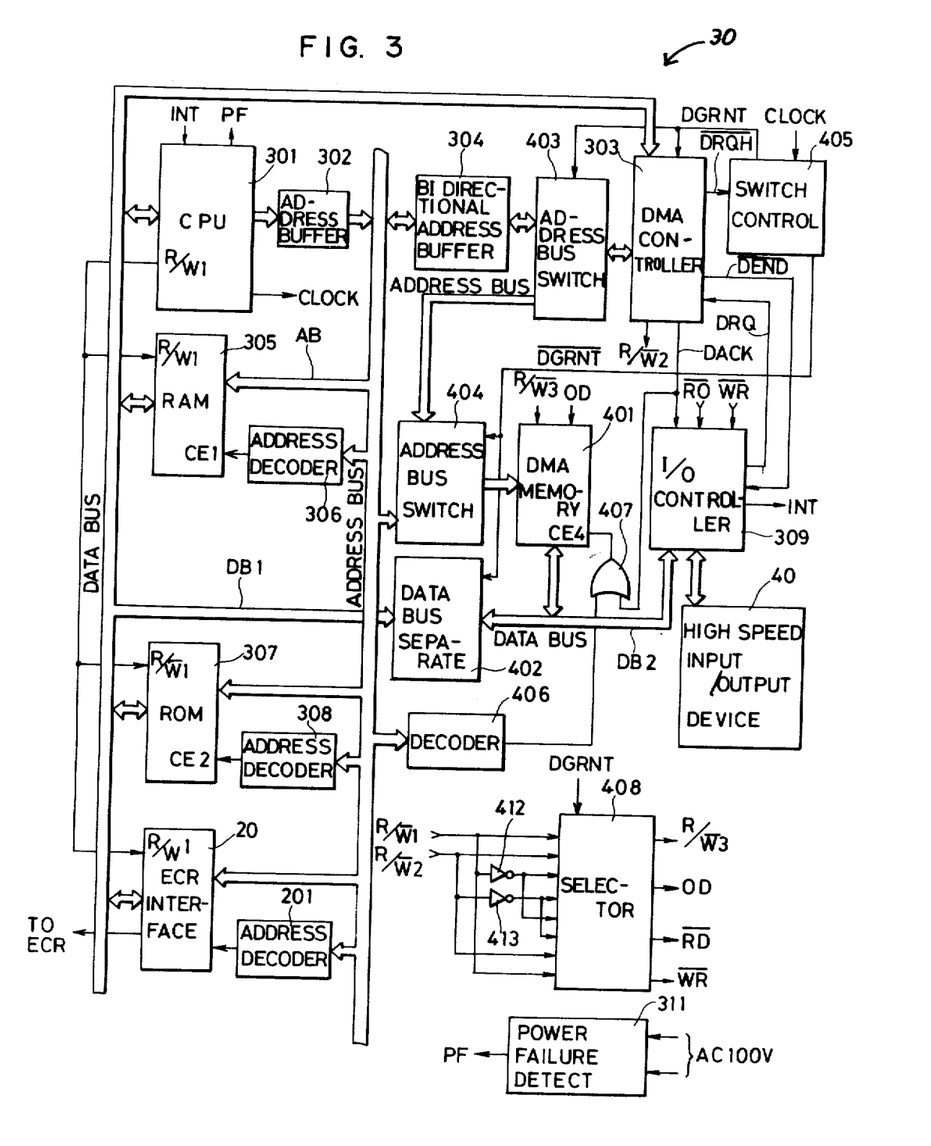
FIG. 3 is a more specific block diagram of a direct memory access control portion in accordance with one embodiment of the present invention.

FIGS. 3 to 7 are block diagrams of the direct memory access control portion included in one embodiment of the present invention. FIG. 3 is substantially the same as FIG. 2 except for the following aspects. A direct memory access memory 401 is provided for the purpose of transferring data to and from the high speed input/output device 40 without direct control by the central processing unit 301. The direct memory access memory 401 is connected to the input/output controller 309 by a data bus DB2. The data bus DB2 is connected through a data bus separating circuit 402 to the data bus DB1 which is connected to the central processing unit 301. The data bus separating circuit 402 is operative to separate the data busses DB1 and DB2 during a direct memory access transfer. A first address bus switch circuit 403 is provided between the direct memory access controller 303 and the bidirectional address buffer 304 for switching the address bus connected to the direct memory access controller 303 between the central processing unit 301 and the address bus connected a second address bus switch 404.

The second address bus switch circuit 404 is provided between the direct memory access memory 401 and the address bus AB of the central processing unit 301 for switching the address bus connected to the direct memory access memory 401 between the address bus connected to the central processing unit 301 and the address bus connected to the first address bus switch 403. Although in the FIG. 2 diagram the direct memory access controller 303 was adapted to provide the HALT request signal to the central processing unit 301 when the direct memory access request DRQ is received from the input/output controller 309, the FIG. 3 diagram operates such that a DRQH signal is provided to a switch control circuit 405 in place of the HALT request signal. The switch control circuit 405 provides the switch signals (DGRNT signal and DGRNT signal) to the previously described data bus separating circuit 402 and the first and the second address bus switch circuits 403 and 404 during a direct memory access transfer.

A decoder 406 for generating a chip enable signal CE4 for selecting the direct memory access memory 401 is further connected to the address bus AB. The chip enable signal CE4 is applied to the direct memory access memory 401 through an OR gate 407. When the input/output controller 309 provides the direct memory access request signal DRQ to the direct memory access controller 303, the direct memory access controller 303 generates the acknowledge signal DACK but the acknowledge signal DACK is also applied to the direct memory access memory 401 through the above described OR gate 407.

The direct memory access control portion 30 also comprises a selector 408. The selector 408 is supplied with an R/W1 signal obtained from the central processing unit 301, a signal obtained through inversion of the R/W1 signal by the inverter 412, an R/W2 signal obtained from the direct memory access controller 303, and a signal obtained through inversion of the R/W2 signal by the inverter 413. The selector 408 is responsive to the DGRNT obtained from the switch control circuit 405 to select the R/W1 signal or the R/W2 signal and to select the inversion of the R/W1 signal or the inversion of the R/W2 signal, thereby to provide an R/W3 signal and an OD signal to the direct memory access memory 401. Further, an RD signal and a WR signal are obtained from the selector 408 and applied to the input/output controller 309.

Figure 4:
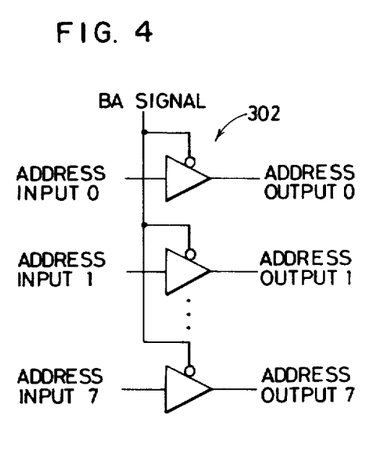
FIG. 4 is a block diagram of an address buffer shown in FIG. 3.
Figure 5:
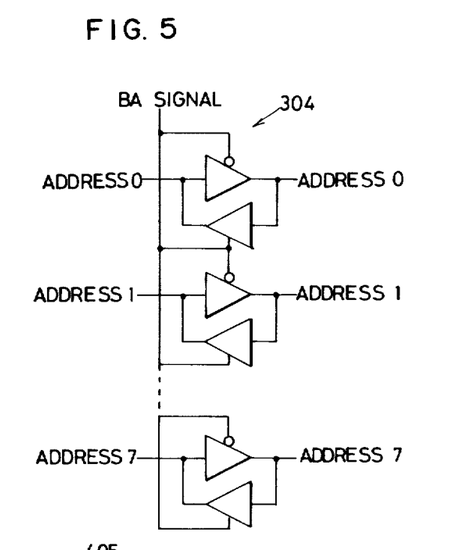
FIG. 5 is a block diagram of a bidirectional address buffer shown in FIG. 3.
Figure 6:
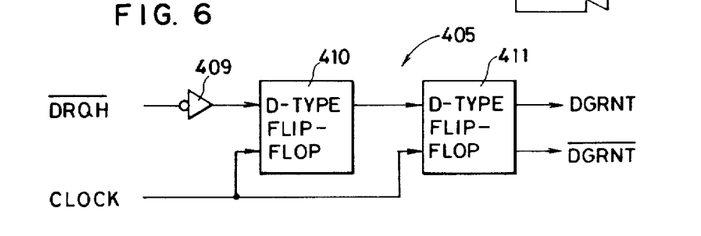
FIG. 6 is a block diagram of a switch control circuit shown in FIG. 3.
Figure 7:
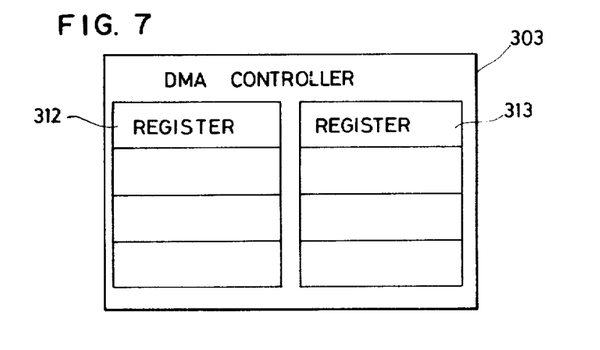
FIG. 7 is a block diagram of a direct memory access controller shown in FIG. 3.

Again, referring to FIG. 3, the central processing unit 301 may be implemented by a microprocessor, MC6802 manufactured by Motorola Incorporated, U.S.A., the random access memory 305 and the direct memory access memory 401 may be implemented by an integrated circuit, PD445LC-1 manufactured by Nippon Electric Co., Ltd., Japan, the read only memory 309 may be implemented by an integrated circuit, 2710 manufactured by Intel Corporated, U.S.A., the direct memory access controller 303 may be implemented by an integrated circuit, ND46504 manufactured by Hitachi, Ltd., Japan, and the input/output controller 309 may be implemented by an integrated circuit, PD765 manufactured by Nippon Electric Co., Ltd., Japan. Furthermore, the address buffer 302 may be implemented by a buffer circuit of an integrated circuit as shown in FIG. 4, and likewise the bidirectional address buffer 304 may be implemented by an integrated circuit as shown in FIG. 5. The switch control circuit 405 comprises an inverter 409 and D-type flip-flops 410 and 411, as shown in FIG. 6. Furthermore, the direct memory access controller 303 comprises a register 312 for storing the address data, and a register 313 for storing the number of data transfers to be made, as shown in FIG. 7.

Figure 8:
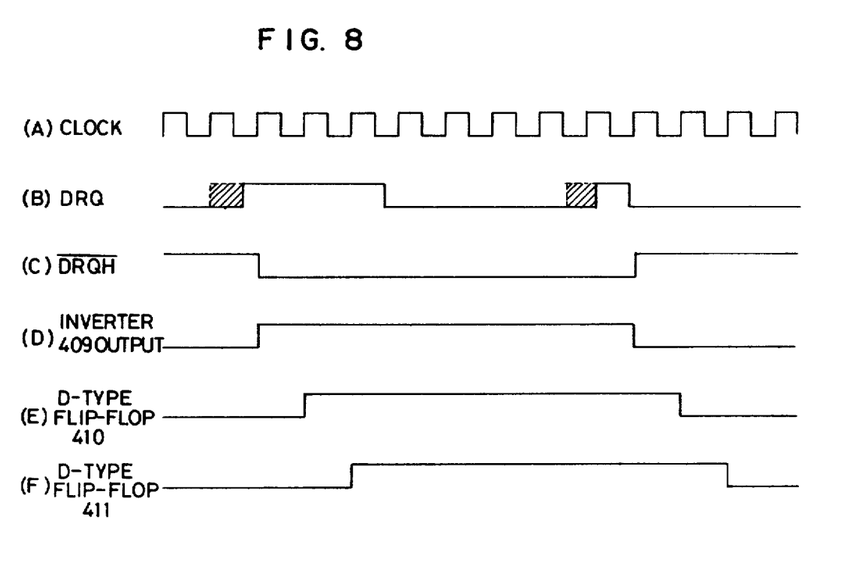
FIG. 8 is a timing chart depicting the operation of the switch control circuit shown in FIG. 6.

FIG. 8 is a timing chart for depicting an operation of the switch control circuit 405. Now referring to FIGS. 6 and 8, the operation of the switch control circuit 405 will be described. The input/output controller 309 provides a direct memory access request signal DRQ after receiving the first data to be transferred. When the direct memory access request signal DRQ is provided from the input/output controller 309 to the direct memory access controller 303, the direct memory access controller 303 makes the DRQH signal low. The DRQH signal is inverted by the inverter 409 and the inverted output is applied to the D-type flip-flop 410. The D-type flip-flop is supplied with a clock pulse. The clock pulse and the DRQH signal are asynchronous. The D-type flip-flop 410 is responsive to the rise of the clock pulse as shown by the hatched portion in FIG. 8(A), to store the DRQH signal. The output signal from the D-type flip-flop 410 is applied to the D-type flip-flop 411 in the following stage. The D-type flip-flop 411 is resonsive to the rise of the following clock pulse to store the DRQH signal stored in the D-type flip-flop 410. The switch signals DGRNT and DGRNT are obtained from the D-type flip-flop 411. Meanwhile, the DRQH signal, the DGRNT signal and the DGRNT signal maintain their states until the direct memory access transfer of one block of data (n bytes) is completed.

Figure 9:
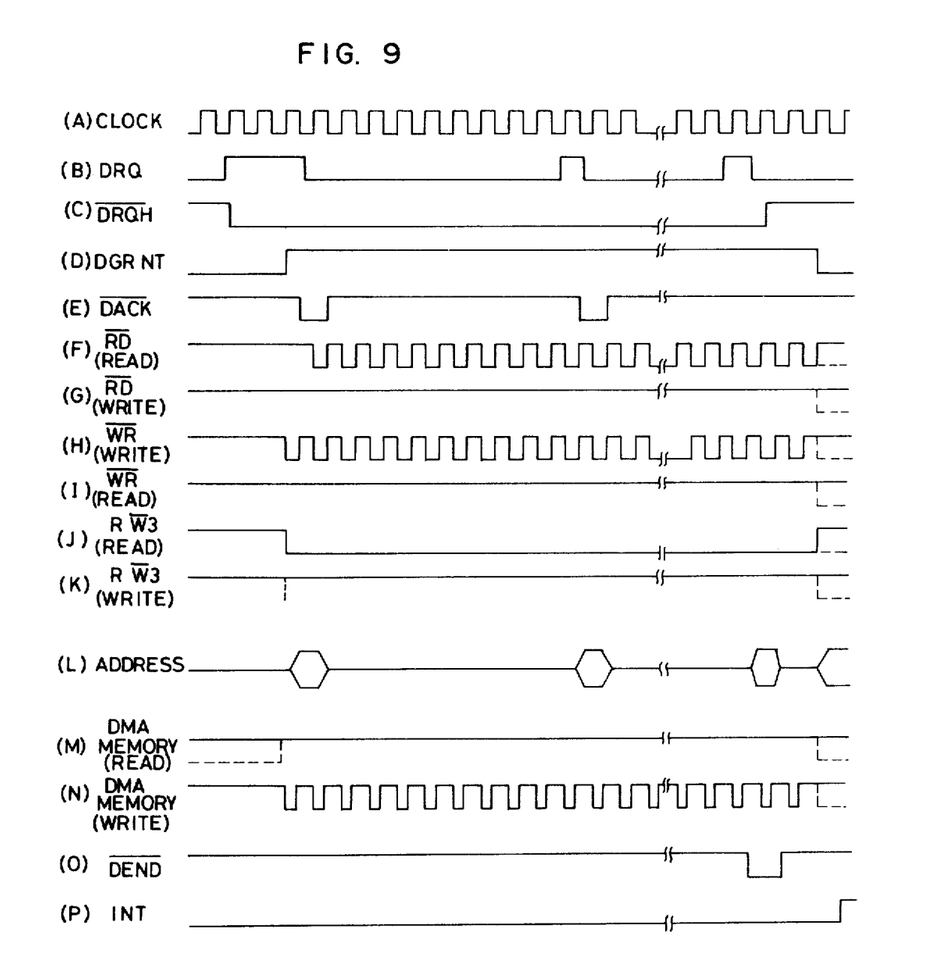
FIG. 9 is a timing chart depicting the operation of the direct memory access control portion shown in FIG. 3.

FIG. 9 is a timing chart showing the waveforms at the various portions of the direct memory access control portion 30 shown in FIG. 3. Now referring to FIGS. 3 to 9, the READ operation for transferring the data from the high speed input/output device 40 to the direct memory access memory 401 in the direct memory access mode will be described. The central processing unit 301 provides a command to the direct memory access controller 303 and the input/output controller 309 as preparatory processing of the direct memory access transfer. More specifically, the central processing unit 301 stores the address data in the register 312 of the direct memory access controller 303 and stores the number of data transfers to be made to the direct memory access memory 401 in the register 313 for the purpose of storing the data in the predetermined address of the direct memory access memory 401. Furthermore, the central processing unit 301 brings the R/W1 signal to the high level. As a result, the direct memory access controller 303 assumes the READ state. On the other hand, since the switch control circuit 405 is not supplied with the DRQH signal, the GRANT signal has become low. Therefore, the selector 408 brings the RD signal low. As a result, the input/output controller 309 assumes the READ state. The input/output controller 309 reads the data sent from the high speed input/output device 40.

The input/output controller 309 is responsive to the reception of one byte of data from the high speed input/output device 40 to provide the direct memory access request signal DRQ to the direct memory access controller 303. The direct memory access controller 303 acknowledges the direct memory access request signal DRQ and provides the DRQH signal to the switch control circuit 405. The switch control circuit 405 is responsive to the clock signal generated from the central processing unit 301 to latch the DRQH signal. As a result, the DGRNT signal of the switch control circuit 405 becomes high and the DGRNT signal becomes low. The data bus separating circuit 402 is responsive to these signals to separate the data bus DB1 of the central processing unit 301 from the data bus DB2. Thus, the direct memory access memory is connected to the input/output controller 309 through data bus DB2, but not to the central processing unit 301.

Also, the first address bus switch circuit 403 switches the address bus of the direct memory access controller 303 to the second address bus switch 404 and the second address bus switch circuit 404 switches the address bus of the direct memory access memory 401 to the direct memory access controller 303. More specifically, the address bus of the direct memory access controller 303 and the address bus of the direct memory access memory 401 are separated from the central processing unit 301 and the address bus of the direct memory access controller 303 and the address bus of the direct memory access memory 401 are connected together. Furthermore, the direct memory access controller 303 is responsive to the high DGRNT signal applied to the direct memory controller 303 to provide the acknowledge signal DACK to the input/output controller 309 and also provides the same through the OR gate 407 to the direct memory access memory 401. As a result, the direct memory access memory 401 is enabled.

Further, selector 408 is responsive to the high DGRNT signal to bring the R/W3 signal low and the OD signal high and these respective signals are applied to the direct memory access memory 401. As a result, the direct memory access memory 401 is brought to the READ state. When the direct memory access memory 401 is thus placed in the READ state, the input/output controller 309 stores the data transferred from the high speed input/output device 40 in the address designated in the direct memory access memory 401 through the data bus DB2.

At that time, the central processing unit 301 can perform interrupt processing and the like even during the direct memory access transfer, since the address bus of the central processing unit 301 has been separated from the direct memory access controller 303 and the direct memory access memory 401, and the data bus of the central processing unit 301 has been separated from the direct memory access memory 401 and the input/output controller 309.

When the input/output controller 309 determines that the transfer of one byte of data is completed, the same releases the direct memory access request signal DRQ being applied to the direct memory access controller 303. The direct memory access controller 303 is responsive to the release of the direct memory access request signal DRQ to release the DRQH signal being applied to the switch control circuit 405. The switch control circuit 405 turns the DGRNT signal low and the DGRNT signal high. As a result, the data busses DB1 and DB2 are connected to each other by means of the data bus separating circuit 402.

The first address bus switch circuit 403 switches the address bus of the direct memory access controller 303 to the central processing unit 301. At the same time, the second address bus switch circuit 404 switches the address bus of the direct memory access memory 401 to the central processing unit 301. As a result, the address bus of the central processing unit 301 is connected to the direct memory access controller 303 and direct memory access memory 401 and the data bus of the central processing unit 301 is connected to the direct memory access memory 401 and the input/output controller 309. This series of operations is performed a predetermined number of times and when the transfer of all the data is completed, the transfer end signal DEND from the direct memory access controller 303 is applied to the input/output controller 309. The input/output controller 309 provides the interrupt signal INT to the central processing unit 301 when the transfer end signal DEND is provided. The central processing unit 301 is responsive to the transfer end signal DEND to determine the end of the transfer.

Now the WRITE operation for transferring the data from the direct memory access memory 401 to the high speed input/output device 40 in a direct memory access mode will be described. The central processing unit 301 provides a command to the direct memory access controller 303 and the input/output controller 309 as preparatory processing. More specifically, the central processing unit 301 stores in the register 312 of the direct memory access controller 303 the addresses of the data to be transferred from the direct memory access controller 303, the first address of the stored data. The central processing unit 301 also stores in the register 313 of the direct memory access controller 303 the required number of data transfers to be made from the direct memory access memory 401 to the high speed input/output device 40. Then the central processing unit 301 brings the R/W1 signal low. When the R/W1 signal becomes low, the selector 408 provides a low W/R signal to the input/output controller 309. Furthermore, the central processing unit 301 generates an address signal for enabling the direct memory access memory 401. The decoder 406 is responsive to the address signal to provide the chip enable signal CE4. The chip enable signal CE4 is applied through the OR gate 407 to the direct memory access memory 401, thereby to enable the direct memory access memory 401.

By the above described preparatory processing, the first byte of data is provided from the predetermined address of the direct memory 401 to the input/output controller 309. The input/output controller 309 is responsive to reception of the first byte of data to provide the direct memory access request signal DRQ to the direct memory access controller 303. The direct memory access controller 303 causes a high GRANT signal to be generated by the switch control circuit 405 in the same manner as the operation in the previously described READ state, whereby a low DGRNT signal is generated from the switch control circuit 405. The address bus of the direct memory access controller 303 and the direct memory access memory 401 are coupled together and separated from the central processing unit 301 by these signals. Also, the data bus DB2 is separated from the data bus DB1. The direct memory access memory 401 is further enabled in response to the acknowledge signal DACK obtained from the direct memory access controller 303.

Furthermore, the selector 408 is responsive to the high GRANT signal to make the R/W3 signal high and the OD signal low and the WR signal low. As a result, the data stored in the direct memory access memory 401 is transferred through the input/output controller 309 to the high speed input/output device 40.

The input/output controller 309 determines that the transfer of one byte of data is completed, thereby releasing the direct memory access request signal DRQ. Thereafter the same operation as that in the previously described READ state is performed. This series of operations is performed each time one byte of data is transferred. When the direct memory access controller 303 determines that the transfer of all the data is completed, the same provides the transfer end signal DEND to the input/output controller 309. When the transfer end signal DEND is provided, the input/output controller 309 provides the interrupt signal INT to the central processing unit 301. Accordingly, the central processing unit 301 reads the contents in the status register, now shown, included in the input/output controller 309, thereby to check error bits and the like. In the absence of an error bit, the operation of the direct memory access of one block (n bytes) is terminated.

Now the FIG. 9 timing chart will be briefly described. When a high direct memory access request signal DRQ is obtained from the input/output controller 309, the direct memory access controller 303 is responsive to a rise of the clock pulse to check the direct memory access request signal DRQ for the first byte. However, the direct memory access controller 303 is responsive to a fall of the clock pulse to check the direct memory access request signal DRQ from the second byte to the final byte. The direct memory access request signal DRQ at each byte is reset a predetermined time period after the switch control circuit 405 generates the DGRNT signal and the direct memory access controller 303 provides to the input/output controller 309 the R/W signal, the address data and the acknowledge signal DACK. After all the direct memory access transfers are terminated, the transfer end signal DEND is provided from the direct memory access controller 303 to the input/output controller 309. The input/output controller 309 provides the interupt signal INT to the central processing unit 301 when the transfer end signal DEND is provided.

Figure 10:
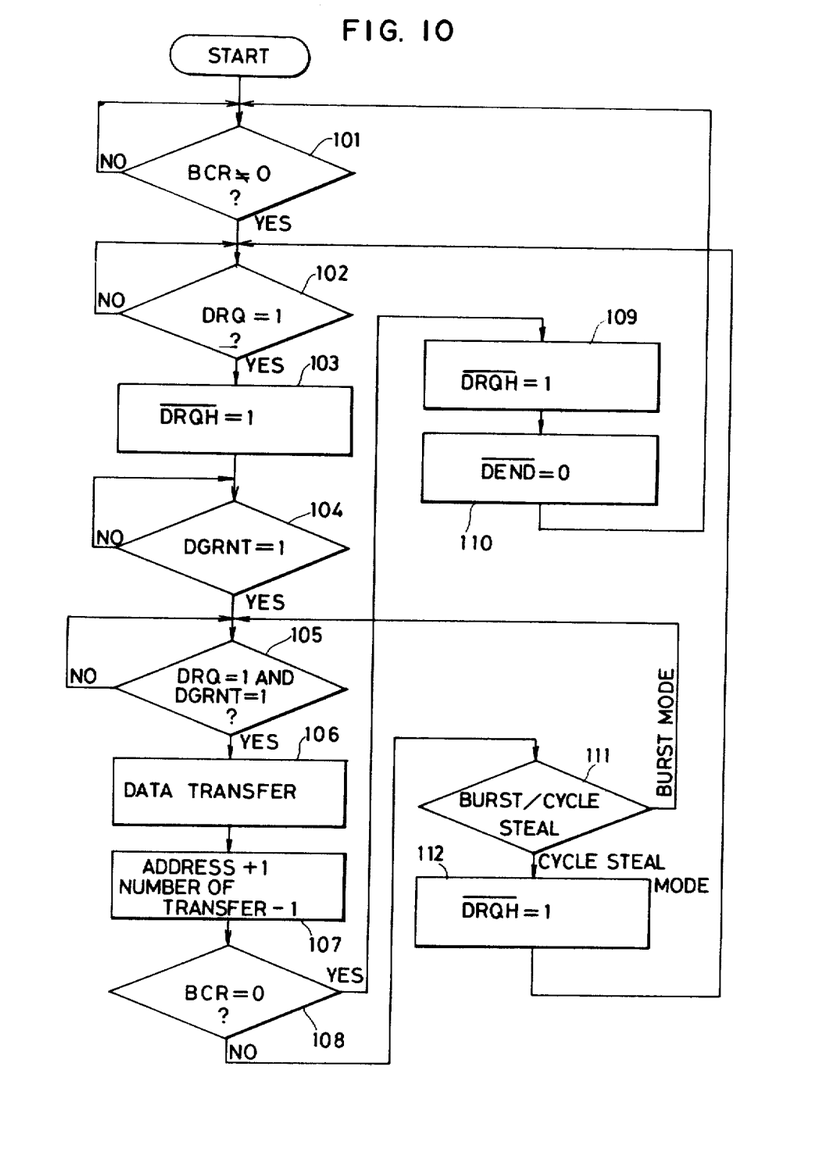
FIG. 10 is a flow diagram depicting the operation of one embodiment of the present invention.

FIG. 10 is a flow diagram depicting an operation of one embodiment of the present invention. FIG. 10 depicts the previously described operation in a flow diagram manner. More specifically, the direct memory access controller 303 determines at the step 101 whether the signal indicating the number of data transfers (BCR) being stored in the register 313 is zero. If this data transfer number assumes a given value, then the direct memory access controller 303 determines at the step 102 whether the direct memory access request signal DRQ is available. When the direct memory access controller 303 determines that the direct memory access request signal DRQ is available, then at the step 103, the DRQH signal is brought low. Then the direct memory access controller 303 determines at the step 104 whether the DGRNT signal has become high. When the direct memory access controller 303 determines at the step 105 that the direct memory access request signal DRQ is high and the DGRNT signal is high, then at the step 106 the same performs the direct memory access transfer. The direct memory access controller 303 functions at the step 107 to add +1 to the address data stored in the register 312 and to add −1 to the transfer data number stored in the register 313. Then the direct memory access controller 303 determines at the step 108 whether the data transfer number stored in the register 313 has become zero. If and when the data transfer number is not zero, then the direct memory access controller 303 determines at the step 111 whether the operation is in the burst mode or the cycle steal mode. In the case of the burst mode, the direct memory access controller 303 returns to the step 105, whereas in case of the cycle steal mode the direct memory access controller 303 brings the DRQH signal high at the step 112 and returns to the step 102.

If the direct memory access controller 303 determines at the step 108 that the data transfer number is zero, then the same brings at the step 109 the DRQH signal high and brings at the step 110 the transfer end signal DEND, thereby to return to the initial state.

According to the embodiment shown of the present invention, when the operation is to be executed in the central processing unit mode, the central processing unit 301, the direct memory access controller 303, the direct memory access memory 401 and the input/output controller 309 are coupled by the data bus and the central processing unit 301, the direct memory access controller 303 and the direct memory access memory 401 are coupled by the address bus, whereby a predetermined operation can be performed. Furthermore, when the data is transferred in the direct memory access mode, the direct memory access controller 303 and the direct memory access memory 401 are coupled by the address bus and are separated from the central processing unit 301, while the direct memory access memory 401 and the input/output controller 309 are coupled by the data bus and the central processing unit 301 is separated from the transfer line of the direct memory access, thereby to enable transfer in accordance with the direct memory access system and interrupt operation by the central processing unit 301 in a parallel manner without placing the central processing unit 301 in a floating state. Accordingly, if an interrupt signal is provided to the central processing unit 301 while the data is being transferred in accordance with the direct memory access system, the central processing unit 301 can immediately perform the operation for that purpose.

In the above described embodiment, the address bus switch circuit 403 was switched by the DGRNT signal obtained from the switch control circuit 405 and the address bus switch circuit 404 and the data bus separating circuit 402 were controlled by the DGRNT signal. However, the present invention is not limited to such embodiment and alternatively the address bus switch circuits 403 and 404 and the data bus separating circuit 402 may be controlled by obtaining a control signal from the central processing unit 301. More specifically, the central processing unit 301 may be responsive to the direct memory access request to provide the switching address data through the address bus AB to the decoder 406 and the address data may be decoded by the decoder 406 and then the address bus switch circuits 403 and 404 and the data bus separating circuit 402 may be controlled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A direct memory access control apparatus, comprising:
   input/output means for inputting and outputting data, and for generating a direct memory access request signal;

storage means for storing said data;

central processing means for processing said data;

direct memory access control means responsive to said direct memory access request signal for performing direct data transfer between said storage means and said input/output control means;

a data bus;

data bus control means having a first state in which said direct memory access control means is interconnected through said data bus to said storage means, and having a second state wherein said direct memory access control means is coupled to both said central processing means and said storage means through said data bus;

an address bus having portions connected to said central processing unit, said direct memory access control means, and said memory means;

first address bus switching means having a first state wherein said address bus portion connected to said central processing means is disconnected from said address bus portion connected to said direct memory access control means whereby said direct memory access control means bus portion is available for connection to said memory means, and a second state wherein said central processing means address bus portion is connected to said direct memory access control means data bus portion;

second address bus switching means having a first state wherein said memory means address bus portion is interconnected to said direct memory access control means address bus portion made available in said first state of said first address bus switching means and wherein said memory means address bus portion is disconnected from said central processing means address bus portion, and a second state wherein said memory means address bus portion is connected to said central processing means address bus portion; and switch control means responsive to said direct memory access request signal from said input/output means for causing said data bus separating means to assume its first state, and for causing said first and second address bus switching means to assume their first states.

2. In a processing system having a central processing unit, at least one addressable circuit, a central data bus connected between said central processing unit and said addressable circuit, a central address bus connected between said central processing unit and said addressable circuit, a direct memory access apparatus, comprising:

input/output means for inputting and outputting data, and for producing a direct memory access request signal;

storage means for storing data;

direct memory access control means responsive to said direct memory access request signal for performing direct data transfers between said storage means and said input/output control means;

a second data bus interconnecting said direct memory access control means and said storage means;

data bus switching means having a first state interconnecting said central data bus to said second data bus such that said central processing means communicates through said data busses with said memory means and said input/output means, and a second state disconnecting said central data bus from said second data bus;

a second address bus connected to said direct memory access control means;

a third address bus connected to said memory means; and address bus control means having a first state connecting said second and third address busses to said central address bus, and having a second state disconnecting said second and third address busses from said central address bus and connecting said second address bus directly to said third address bus;

wherein said data bus control means and said address bus control means are responsive to said memory access request signal for assuming their second states during a direct memory access, such that said direct memory access control means is interconnected with said memory means through said second data bus and said second and third address busses while simultaneously said central processing unit is connected to said addressable circuit through said central address bus and said central data bus such that parallel operation can be performed.

3. A processing system as set forth in claim 2 wherein said address bus control means includes a fourth address bus, a first address bus switch means for connecting said second address bus either to said central address bus or to said fourth address bus, and a second address bus switch means for connecting said third address bus either to said central address bus or to said fourth address bus.

4. A processing system as set forth in claim 2 wherein said addressable circuit includes a random access memory and a read only memory.

5. A processing system as set forth in claim 4 wherein said addressable circuit further includes an electronic cash register interface.

6. A system as set forth in claim 1 wherein said central processing unit is programmed for performing data transfer between said storage means and said input/output control means in the absence of said direct memory access request signal, and further comprising first signal generating means responsive to said direct memory access request signal for generating an enable signal for enabling said storage means and causing said data bus control means and said address bus control means to assume, respectively, their second states.

* * * * *